W. J. McFAUL.
ATTACHMENT FOR PLOWS.
APPLICATION FILED DEC. 13, 1907.
900,413.
Patented Oct. 6, 1908.
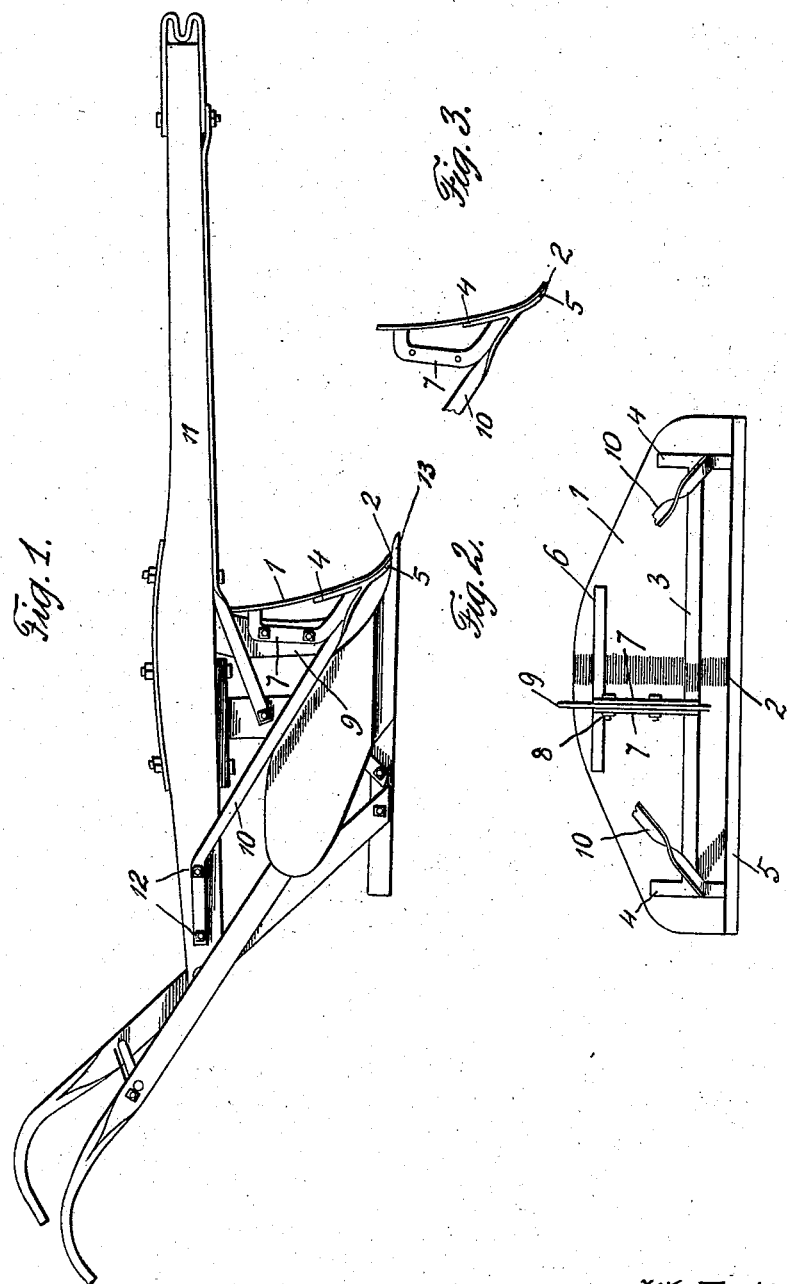

UNITED STATES PATENT OFFICE.

WILLIAM J. McFAUL, OF OAKDALE, PENNSYLVANIA.

ATTACHMENT FOR PLOWS.

No. 900,413.　　　Specification of Letters Patent.　　　Patented Oct. 6, 1908.

Application filed December 13, 1907. Serial No. 406,346.

*To all whom it may concern:*

Be it known that I, WILLIAM J. MCFAUL, a citizen of the United States of America, residing at Oakdale, in the county of Allegheny and State of Pennsylvania, have invented certain new and useful Improvements in Attachments for Plows, of which the following is a specification, reference being had therein to the accompanying drawing.

This invention relates to an attachment for plows, and the primary object of the invention is, to provide a novel attachment by which limestone, earth and other materials can be easily and quickly spread and distributed upon a surface.

My invention aims to provide a plow attachment for spreading material, the attachment being applicable to various types of plows, but it is particularly designed for leveling earth or similar material. In this connection, the invention can also be used for back-filling trenches, leveling piles of earth or similar material deposited by dump wagons for agricultural purposes, and in the construction of streets, railways and other work.

To this end, I have devised a simple and inexpensive spreader that can be easily attached to a plow and braced, whereby it will withstand the rough usage to which the same is subjected when leveling limestone or other material. The attachment comprises a plate arranged transversely of the plow, said plate being suitably braced from the beam, sod cutter or any suitable part of the plow according to the construction of the same.

The invention will be presently described in detail, and reference will now be had to the drawing forming a part of this specification, wherein, Figure 1 is an elevation of a plow equipped with my attachment, Fig. 2 is a rear elevation of the attachment partly broken away, illustrating the manner in which the same is secured to the sod cutter of a plow, and Fig. 3 is an end view of the attachment.

The plow attachment comprises a plate 1 having a straight edge 2. This straight edge is braced by a bar 3 having T-shaped heads 4, particularly designed for bracing the ends of the plate 1. In addition to the bar 3 is arranged another beveled bar 5 for bracing the lower edge of the plate 1, this bar being welded or suitably secured to said plate and acting as a show therefor.

At the upper edge of the plate 1 I arrange another bar 6, this bar carrying rearwardly extending parallel straps 7 adapted to be bolted or otherwise secured, as at 8, to the sod cutter 9 of a plow. These straps 7 are adapted to support the central portion of the plate 1, and in order to prevent the ends of the plate 1 from sagging, I provide the same with rearwardly extending braces 10, these braces being connected to the beam 11 of the plow by nuts and bolts 12 or similar fastening means.

The spreader attachment is adapted to rest upon the plow point 13, in close proximity to the surface over which said point passes. It is therefore evident that the material in the path of the spreader attachment will be impinged by said attachment and gradually distributed upon the surface over which the plow is moved.

It is apparent that my spreader attachment can be easily and quickly applied to a plow and removed therefrom, when it is not desired to use the same. While not serving functionally the same purpose as a harrow or roller, the spreader serves as a scraper, and to a great extent as a disintegrator of earth, when the same is in operation.

I do not care to confine myself to the specific use of the plow attachment or to the minor details of construction entering into the invention. Such other changes as are permissible by the appended claims can be resorted to without departing from the spirit and scope of the invention.

Having now described my invention what I claim as new, is:—

1. The combination with a plow embodying a beam and a sod cutter, of a plate arranged transversely of said plow, said plate having a straight lower edge, a shoe secured to said lower edge, upper and lower bars secured to the rear face of said plate for bracing the same, straps carried by said brace bar and connecting with said sod cutter, and braces carried by the lower of said bars upon each side of the plow and secured to the beam thereof.

2. The combination with a plow having a sod cutter, of a spreader attachment for said plow embodying a plate arranged transversely of the plow and resting at its lower end on the plow point, brace bars secured to the rear face of said plate, straps connected to said brace bars and to said sod cutter, and braces connected at their outer ends to said plate and at their inner ends to the beam of the plow.

3. The combination with a plow embodying a plow point, of a spreader attachment secured to the plow and comprising a plate disposed transversely of the plow point and resting at its lower edge on the plow point and supported thereby, and means for firmly securing said plate to the plow.

In testimony whereof I affix my signature in the presence of two witnesses.

WILLIAM J. McFAUL.

Witnesses:
MAX H. SROLOVITZ,
A. J. TRIGG.